United States Patent Office 3,657,254
Patented Apr. 18, 1972

---

3,657,254
3,6-DIMETHYL-1,2,3,4,4a,9a-HEXAHYDRO-γ-CARBOLINE DIHYDROCHLORIDE
Nikolai Konstantinovich Barkov, Belyaevo-Bogorodskoe, kvartal 46–47, korpus 40, kv. 160; Natalya Fedorovna Kucherova, Petroverigsky pereulok 3, kv. 21; Nikolai Konstantinovich Kochetkov, Leninsky prospekt 13, kv. 129; Izida Grigorievna Zhukova, Konkovo-Derevlevo, 6 mikroraion, korpus 27, kv. 78; and Nina Mikhailovna Sharkova, 3 Donskoi proezd 5, kv. 22, all of Moscow, U.S.S.R.
No Drawing. Filed Oct. 31, 1969, Ser. No. 873,096
Int. Cl. C07d 39/00
U.S. Cl. 260—293.55                                    1 Claim

---

ABSTRACT OF THE DISCLOSURE 3,6 - dimethyl - 1,2,3,4,4a,9a - hexahydro - γ - carboline dihydrochloride of the formula

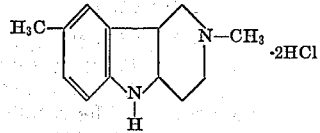

a method of producing said compounds including the steps of reducing 3,6-dimethyl-1,2,3,4-tetrahydro-γ-carboline hydrochloride in an aqueous-acidic medium at a temperature of up to 100° C., with subsequent alkalization of the reaction mixture, separation of the resulting base which is 3,6 - dimethyl - 1,2,3,4,4a,9a-hexahydro-γ-carboline, treating it with hydrogen chloride, and isolarion of the target product; a medicinal preparation, comprising said compond as an active principle.

---

The present invention relates to a new compound, 3,6-dimethyl-1,2,3,4,4a,9a-hexahydro-γ-carboline dihydrochloride, to a method for its production and its use.

According to the invention, the formula of the new compound proposed herein, 3,6-dimethyl-1,2,3,4,4a,9a-hexahydro-γ-carboline dihydrochloride, is as follows

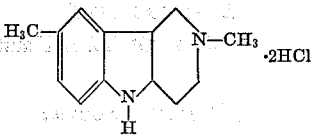

This compound is a crystalline substance of white color with a slightly creamish tint and is readily soluble in water. Its M.P. is 274–276° C.

According to the invention 3,6-dimethyl-1,2,3,4,4a,9a-hexahydro-γ-carboline dihydrochloride is produced by reducing 3,6-dimethyl-1,2,3,4-tetrahydro-γ-carboline hydrochloride in an aqueous-acidic medium at a temperature of up to 100° C. with subsequent alkalization of the reaction mixture, separation of the resulting base, 3,6-dimeth-1,2,3,4,4a,9a-hexahydro-γ-carboline, treatment of the base with hydrogen chloride and isolation of the product.

It is preferred to use amalgamated zinc or tin as a reducing agent.

It is preferable to use an aqueous hydrochloric acid medium as the aqueous-acidic medium.

The method of the present invention is effected as follows.

3,6-dimethyl-1,2,3,4-tetrahydro-γ-carboline hydrochloride is dissolved in water, and a reducing agent, namely, amalgamated zinc or tin, is added to the solution, the reaction mixture is heated to 100° C., and concentrated hydrochloric or sulphuric acid, preferably hydrochloric acid, is introduced dropwise into the mixture with stirring. The mixture is heated for 4.5–6 hours. The reducing agent and acid are introduced in several batches. Then alkali is introduced into the reaction mixture (with the mixture being cooled with ice down to a temperature not above 15° C.), and the obtained base, that is, 3,6-dimethyl-1,2,3,4,4a,9a-hexahydro-γ-carboline, is extracted with ether. The ethereal extracts are dried with magnesium sulphate, the ether is distilled off, and the residue is treated with hydrogen chloride, the resulting product being 3,6-dimethyl-1,2,3,4,4a,9a-hexahydro-γ-carboline dihydrochloride. The yield is 60–72%. M.P. of the product is 274–276° C.

3,6-dimethyl-1,2,3,4,4a,9a-hexahydro-γ-carboline dihydrochloride has been established as having pharmacological activity and may be used as an active principle of a medicinal preparation.

According to the present invention a medicinal preparation having a psychotropic effect includes 3,6-dimethyl-1,2,3,4,4a,9a-hexahydro-γ-carboline dihydrochloride as an active principle. The medicinal preparation which we will here and hereinafter conventionally term carbidine, according to the invention, may contain an active principle in combination with a pharmaceutic filler for tablets, or a diluent for injection solutions. The preparation is one of venena B and has a psychotropic effect. The mechanism of action of the preparation is associated with its negative influence on adrenergic structures (adreno-blocking action and hindrance to the return of free noradrenalin from the extracellular space).

The effect produced by carbidine becomes rapidly manifested, often after a single administration. This effect is characterized by a number of specific features: by a combination of neuroleptic, antidepressive and energizing results, as well as by that it takes place only with respect to definite syndromes and states of the patient.

Carbidine proves to be effective for treating mental diseases, mostly, paranoiac depression in case of schizophrenia, affective delusions in simple schizophrenia, and also for treating patients suffering from alcoholic psychoses and syndromum abstinentiae.

Carbidine has passed clinical test on 650 patients. In case of depressive-paranoiac form of schizophrenia a favourable symptom for treating patients with the present preparation was as follows: a manifest acuteness of the state with a sudden commencement of the attack, fear, anxiety, massive and intense sensations of disquietude, often imminent to life, as well as predominance of sensory delusions over the affective ones with a manifest Kandinsky-Clérambault, syndrome that has a pronounced sensory character.

The administration of the present preparation resulted in the sedation of patients, regression of sensory delusion and hallucinations, psychic automatisms with a simultaneous diminution of depression profundity and general activation of patients. Sometimes the effect of the preparation proves to be fulminant, with the exit of the patient from the state of mental depression after 4–7 days.

In case of depressive-paranoiac schizophrenia the preparation is administered per os or by intramuscular injection, starting from the dose of 12.5–25 mg. and further increasing it up to 75–100 mg., somethimes to 150 mg., in fractional doses 3 times a day.

Should the convalescence effect with the preparation administered in the dose up to 150 mg. per day diminish, it is recommended to reduce the dose down to 75–50 mg., which will expedite further improvement of the state of patients.

The effect of carbidine in case of cyclic schizophrenia with the depressive-paranoiac structure of the attack is similar to that described hereinabove. In other periodic forms of schizophrenia (oneuroidal catatony, acute paraphrenia) the preparation is effective when depressive-delirium phenomena are present in the clinical picture. Carbidine produces positive effects when depression states of patients originate in a simple form, or in case of more profound states accompanied by a certain degree of embarrassment, derealization and mental derangements, or, else, in case of prolonged subdepressive states with the patient experiencing feelings of becoming altered, obtusion, or, still, in case of almost continuous affective fluctuations with symptoms of depression and dysphophia, discontent, irritability. For treating affective disorders within a simple form, the preparation is applied starting from a dose of 12.5 mg. with a gradual increase of the dosage up to 75–100 mg., sometimes, when necessary, in combination with imipramine. Carbidine produces a rapid therapeutic effect in treating acute alcoholic paranoia and acute hallucinosis.

When treating alcoholic psychoses, the preparation is administered in the form of intramuscular injections in doses of 50 mg. with an interval of 2 hours (up to 3–4 injections), and then 3 times a day, or 3 times a day from the start.

The preparation is effective when treating not grave forms of delirium with a relatively non-manifest excitation, with no massive hallucinatory experiences, and with a predominance of illusory disorders.

Positive effect of carbidine has also been observed in cases of syndromum abstinentiae, where its administration resulted in the disappearance of illusory disorders and vegetative function disturbances.

The carbidine preparation may be applied in the form of powders, tablets of 25 mg. each, and as injection solutions containing 1.25 wt. percent of the active principle.

The dosage of the preparation depends in different psychopathological states of patients. Most often an initial dose of 12.5 mg. proves to be applicable, with its subsequent increase up to 75–100, sometimes up to 150 mg.

The preparation is contraindicated for functional disturbances of lever and for intoxications with narcotics and analgetics, since carbidine potentiates the effects of narcotics and analgetics.

Side effects of the carbidine preparation are insignificant. Sometimes tremor subtilis may be observed, especially in the upper extremities of a patient, constraint and higher muscular tonus, as well as hypekineses inexpressivae. In certain cases correctors are to be prescribed (such as arthane and the like).

For a better understanding of the present method of producing 3,6 - dimethyl-1,2,3,4,4a,9a-hexahydro-γ-carboline dihydrochloride, given hereinbelow are the following examples.

EXAMPLE 1

165.7 g. of 3,6-dimethyl-1,2,3,4-tetrahydro-γ-carboline hydrochloride are dissolved in 150 ml. of water, then 198 g. of zinc dust and 0.25 g. of mercuric chloride are added thereto, and the reaction mixture is heated to 60–80° C. Then 990 ml. of concentrated hydrochloric acid are introduced dropwise with stirring, and the reaction mixture is heated during 1.5–2 hours.

The addition of zinc dust and hydrochloric acid is repeated twice again in the same amounts and during the same period of time. Then an excess of 45–50% concentration solution of caustic soda is introduced into the reaction mixture, after which it is cooled down with ice to a temperature not above +15° C., and the resulting base, which is 3,6-dimethyl-1,2,3,4,4a,9a-hexahydro-γ-carboline, is extracted with 6.6 l. of ether (by using 1.65 l. of ether 4 times. The ethereal extracts are dehydrated with magnesium sulphate, ⅔ of the ether are distilled off, and 25% alcoholic solution of hydrogen chloride is added to the residue for the reaction to be acidic (pH=5.0–4.0). The precipitata is filtered off. The yield of the target product is 138 g. (72%) M.P. is 274–276° C.

Found (percent): C, 56.91; 56.88; H, 5.23; 7.25; N, 9.85; 9.66; Cl, 25.62; 25.59; $C_{13}H_{20}N_2Cl_2$.

Calculated (percent): C, 56.73; H, 7.32; N, 10.18; Cl, 25.76.

EXAMPLE 2

8.3 g. of 3,6-dimethyl-1,2,3,4-tetrahydro-γ-carboline hydrochloride are dissolved in 75 ml. of water, and 160 g. of granulated tin and 100 ml. of concentrated hydrochloric acid are added thereto. The reaction mixture is boiled during 1.5–2 hours. Hydrochloric acid is added two more times in the same amounts, and boiling is effected during the same period of time. The reaction mixture obtained is filtered.

The process of alkaline treatment, extraction of the base and isolation of the target product is carried out in the same manner as described in Example 1, 57 g. of the target product being obtained (60%) M.P. is 274–276° C. (from 85% ethyl alcohol).

What is claimed is:

1. 3,6-dimethyl-1,2,3,4,4a,9a-hexahydro-γ-carboline dihydrochloride of the following formula:

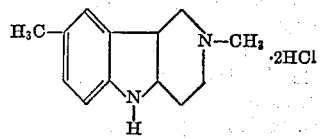

References Cited

Kochetkov et al.: Zhur. Obshcheĭ Khim. 31, 924–30 (1961).

HENRY R. JILES, Primary Examiner

G. T. TODD, Assistant Examiner

U.S. Cl. X.R.

424—267